United States Patent Office 2,976,309
Patented Mar. 21, 1961

2,976,309

PROCESS FOR THE PRODUCTION OF THIOL-PHOSPHORIC ACID ESTERS

Gerhard Schrader, Opladen, Germany, assignor to Farbenfabriken Bayer Aktiengesellschaft, Leverkusen, Germany, a corporation of Germany No Drawing. Filed Oct. 29, 1956, Ser. No. 618,714

Claims priority, application Germany Oct. 29, 1955

3 Claims. (Cl. 260—461)

This invention relates to a new and useful process for the production of thiol-phosphoric acid esters, especially of O,O,S-trialkyl-thiol-phosphoric acid esters of the formula:

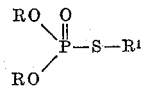

in which each R stands for an alkyl, especially a lower alkyl, group and $R^1$ stands for alkyl groups which may further be substituted by alkoxy, alkylmercapto, aryl, carbalkoxy groups and the like. The compounds which are obtained according to this new process are generally known, they are effective insecticides or pesticides.

Many processes are known for obtaining thio-phosphoric acid esters of the above formula. In German Patent 830,509 there is described a method of preparing these esters by reacting salts of O,O-dialkyl-thiol-phosphoric acids with alkyl mercaptoalkyl chlorides in the presence of organic solvents, especially alcohols. The yields in this reaction are reported to be within the range of about 50–65%. Also, during this process, large amounts of poisonous mercaptans are formed which have to be removed and which, therefore, lead to the necessity for using special separation procedures.

It is the main object of the present invention to provide a new and useful method of preparing thio-phosphoric acid esters by an economical method. Another object is to prepare special valuable phosphorous insecticides of the class of O,O,S-trialkyl-thiol-phosphoric acid esters; still further objects will become apparent as the following description proceeds.

These and the following objects are accomplished by reacting salts of O,O-dialkyl-thiol-phosphoric acids with alkylhalides in an substantially neutral aqueous medium. The following equation may show this reaction:

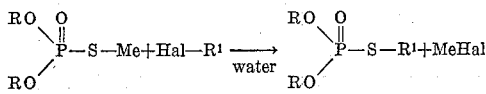

In these formulae, R and $R^1$ stand for the above-mentioned groups, the Me stands for either an alkali group cation, especially sodium, potassium or ammonium and Hal stands for fluorine, chlorine, bromine or iodine, especially for chlorine or bromine. The reaction proceeds preferably at elevated temperatures, in the range of between 30° C. to about 80° C. but somewhat lower and higher temperatures from about 20° to about 100° C. sometimes also may be advisable.

The above-mentioned salts of O,O-dialkyl-thiol-phosphoric acid esters broadly include those in which the alcohol used for esterifying the hydroxyl radicals is an aliphatic (especially lower aliphatic) alcohol. The lower alkanols are especially preferred. Without any limitation there may be named O,O-dimethyl-, O,O-diethyl-, O,O-dipropyl-, O,O-diisopropyl-, O,O-dibutyl-, O,O-diamyl, O,O-dihexyl ester-salts and the like; but also mixed aliphatic esters are suitable reactants according to this inventive reaction.

Alkyl halides which are suitable in this reaction include broadly all alkyl halides, especially chlorides and bromides, even substituted alkyl halides wherein the substituents may be alkoxy-alkylmercapto-, aryl-, carbalkoxy groups and the like. Examples of these classes of compounds are e.g. the methoxy-methyl-, ethoxy-methyl-, methoxy-ethyl-, ethoxy-ethyl-, propoxy-ethyl-, butoxy-ethyl-, methylmercapto-methyl-, ethylmercapto-methyl-, ethylmercapto-ethyl-, ethylmercapto-isopropyl-, ethylmercapto-butyl-, benzyl-, phenyl-ethyl-, p-chlorobenzyl-, p-chlorophenyl-ethyl-, p-nitrobenzyl halides, haloacetic acid esters such as chloroacetic acid ethyl ester, halopropionic acid esters, haloaceto-acetic acid esters such as bromoacetic-acid-ethyl ester, halo ketones such as chloro methyl-ethyl ketone and the like. The foregoing compounds, however, may only indicate how broad the class of possible reactants really is and shall not restrict in any way this invention thereto. This novel process is especially valuable for obtaining well known and active phosphoric acid esters of the formula:

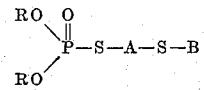

in which R stands for a lower alkyl radical, A stands for a lower alkylene chain and B stands for a lower alkyl radical.

It is rather surprising that an esterification process may be carried out in water. More surprising still is the comparative high yield and the quality of the compounds obtainable according to this process. In addition thereto it has been found, that only a very small amount of mercaptan are formed during this reaction, thus, making this reaction an economical and less hazardous one. The following examples are illustrative but not limitative of the present invention.

*Example 1*

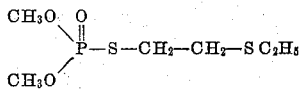

165 g. ammonium salt of O,O-dimethyl-thiophosphoric acid are dissolved in 150 ml. water. While stirring there is added, at about 90° C., 130 g. β-chlorethyl-ethyl-mercaptan. The reaction mixture is heated for 30 minutes at 45° C. and then cooled, 100 ml. chloroform are added and the heavier organic (chloroform) layer is separated, then washed with 25 ml. water and dried. The solvent is distilled off in vacuo and the residue is kept at 50° C. at 1 mm. Hg for at least about 30 minutes to remove the residual chloroform. There are obtained 212 g. (92% of theory) of O,O-dimethyl-S-β-ethylmercaptoethyl phosphate. The crude ester is practically free of free mercaptans.

*Example 2*

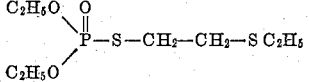

57 g. ammonium salt of O,O-diethylthiophosphoric acid are dissolved in 50 ml. water. At a temperature of about 70° C., there are added while stirring 40 g. β-chloroethyl-ethyl-sulfide and the reaction mixture is maintained at that temperature for an additional hour before cooling and the desired product is isolated as described in Example 1. There are obtained 70 g. O,O-diethyl-S-β-ethylmercaptoethylthiophosphate. The yield is almost quantitative and the reaction product does not contain any significant amount of poisonous mercaptans.

Example 3

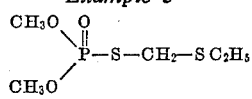
$$\begin{array}{c}CH_3O\\ \phantom{xx}\diagdown\\ CH_3O\diagup\end{array}\!\!\!\!\begin{array}{c}O\\ \|\\ P\end{array}\!\!-S-CH_2-SC_2H_5$$

50 g. ammonium salt of O,O-dimethyl thiophosphoric acid are dissolved in 40 ml. water and at 40° C. there are added 36 g. chloromethyl-ethyl-sulfide. The reaction mixture is maintained at that temperature for an additional hour after which cooling and isolation is effected as described in the foregoing example. There are obtained 60 g. (92% of theory) of the desired ester.

Example 4

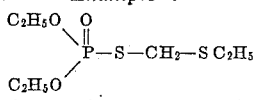

60 g. ammonium salt of O,O-diethylthiophosphoric acid, dissolved in 40 ml. water, are treated with 36 g. chloromethyl-ethyl-sulfide at 40° C. (addition should be carried out within about 10 minutes). The temperature of 40° C. is maintained for 10 additional minutes and the mixture is worked up as described in the foregoing examples. There are obtained 71 g. of the desired ester (97% of theory).

Example 5

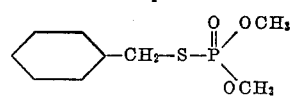

26 g. benzylchloride are dropped into a solution of 35 g. O,O-dimethyl-thiophosphoric acid-ammonium salt in 30 ml. water at a temperature of 60° C. The isolation of the resulting ester is carried out as described in the previous examples. There are obtained 31 g. of the desired product, boiling point at 0.01 mm. Hg at 98° C.

In the same way, there are obtained the esters of the formulae shown in the following table in also almost quantitative yield. The table shows reaction temperature, yield and physical constants of the compounds obtained. The figures in parentheses indicate the amount in g. of starting materials (x/y) x being the appropriate chloride, y being the salt of the appropriate dialkylthiophosphoric acid.

| Formula | Reaction Temperature, degrees | Reaction Time, min. | Amount From (x/y) | Boiling Point at 0.01 mm. Hg |
|---|---|---|---|---|
| C₆H₅-CH₂-S-P(=O)(OC₂H₅)₂ | 60 | 60 | 70 g. (38/60) | 99°. |
| Cl-C₆H₄-CH₂-S-P(=O)(OCH₃)₂ | 70 | 60 | 45 g. (49/55) | 110°. |
| Cl₂-C₆H₃-CH₂-S-P(=O)(OCH₃)₂ | 70 | 60 | 50 g. (59/55) | 125°. |
| Cl₃-C₆H₂-CH₂-S-P(=O)(OCH₃)₂ | 80 | 60 | 48 g. (67/55) | 135°. |
| Cl₂-C₆H₃-CH₂-S-P(=O)(OC₂H₅)₂ | 90 | 60 | 57 g. (48/60) | 123°. |
| Cl₃-C₆H₂-CH₂-S-P(=O)(OC₂H₅)₂ | 95 | 90 | 60 g. (69/60) | 145°. |
| (CH₃O)₂P(=O)-S-CH₂-CO-OC₂H₅ | 70 | 30 | 40 g. (37/50) | 85°. |
| CH₃-CH(CO-OC₂H₅)-S-P(=O)(OC₂H₅)₂ | 80 | 30 | 70 g. (55¹/60) | 93°. |
| CH₃-S-P(=O)(OCH₃)₂ | 40 | 240 | 25 g. (60²/64) | 65° at 1 mm. Hg. |
| CH₃-CO-CH(CH₃)-S-P(=O)(OC₂H₅)₂ | 55 | 60 | 25 g. (33/57) | 86°. |

¹ Bromide instead of chloride.
² Iodide instead of chloride.

I claim:
1. A process for the production of O,O,S-trialkylthiophosphoric acid which comprises reacting, in a substantially aqueous neutral medium, an alkali group salt of O,O-dialkylthiophosphoric acids with an alkyl halide of the general formula:

Hal—R$^1$ wherein R$^1$ stands for a saturated aliphatic radical and Hal stands for halogen at a temperature from about 20° C. to about 100° C.

2. A process for the production of O,O,S-trialkylthiophosphoric acids of the formula:

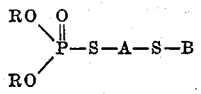

in which R stands for a lower alkyl radical, A stands for a lower alkylene chain and B stands for a lower alkyl radical which comprises reacting, in a substantially aqueous neutral medium, an alkali group salt of O,O-dialkylthiophosphoric acids with an alkyl halide of the general formula:

Hal—A—S—B in which Hal stands for halogen and A and B have the same significance as described above, at a temperature from about 20° to about 100° C.

3. A process for the production of a thiolphosphoric acid ester which comprises reacting in a substantially aqueous, neutral medium an alkali group salt of an O,O-di-lower alkyl thiolphosphoric acid with a chlorobenzyl halide at a temperature from about 20° to about 100° C.

References Cited in the file of this patent
UNITED STATES PATENTS

| | | |
|---|---|---|
| 2,266,514 | Romieux et al. | Dec. 16, 1941 |
| 2,597,534 | Schrader | May 20, 1952 |
| 2,640,847 | Schrader | June 2, 1953 |
| 2,692,891 | Young et al. | Oct. 26, 1954 |
| 2,759,010 | Lorenz et al. | Aug. 14, 1956 |
| 2,815,312 | Schuler | Dec. 3, 1957 |
| 2,815,350 | Speck | Dec. 3, 1957 |
| 2,862,017 | Schrader | Nov. 25, 1958 |